United States Patent [19]

Kordesch et al.

[11] 3,945,847

[45] Mar. 23, 1976

[54] COHERENT MANGANESE DIOXIDE ELECTRODES, PROCESS FOR THEIR PRODUCTION, AND ELECTROCHEMICAL CELLS UTILIZING THEM

[75] Inventors: Karl V. Kordesch, Lakewood; Akiya Kozawa, Middleburg Heights, both of Ohio

[73] Assignee: Union Carbide Corporation, New York, N.Y.

[22] Filed: Jan. 29, 1974

[21] Appl. No.: 437,695

Related U.S. Application Data

[63] Continuation-in-part of Ser. No. 212,908, Dec. 28, 1971, abandoned.

[52] U.S. Cl............. 136/100 R; 136/138; 136/139
[51] Int. Cl.$^2$.................................... B08B 3/00
[58] Field of Search.......... 136/20, 100 R, 111, 123, 136/137, 138, 139

[56] References Cited
UNITED STATES PATENTS

| 1,296,700 | 3/1919 | Ruhoff............... 136/138 |
| 1,637,433 | 8/1927 | Yngve................ 136/139 |
| 2,491,640 | 12/1949 | Blake et al........... 136/136 |
| 2,977,401 | 3/1961 | Marsal et al......... 136/123 |
| 3,113,050 | 12/1963 | Kordesch et al..... 136/123 |
| 3,184,339 | 5/1965 | Ellis................. 136/120 R |
| 3,192,071 | 6/1965 | Vinal................ 136/137 |
| 3,306,781 | 2/1967 | Siller................ 136/138 |
| 3,335,031 | 8/1967 | Kordesch........... 136/123 |

OTHER PUBLICATIONS

Mellor, Comprehensive Treatise on Inorganic & Theoretical Chem., Vol. 5, 1924 p. 753.
Glaister, Compounding for Electrical Conductivity, Technical Report RG–128, Cabot Corp., 10/11/68 pp. 4–7, 18 & 19.

Primary Examiner—Patrick P. Garvin
Assistant Examiner—John F. Niebling
Attorney, Agent, or Firm—Cornelius F. O'Brien

[57] ABSTRACT

Coherent manganese dioxide electrodes comprising particulate manganese dioxide and particulate electrically conductive material substantially uniformly dispersed in a conductive binder wherein said binder comprises colloidal electrically conductive material having a surface area as defined by the B.E.T. method using $N_2$ absorption at 78°K of less than about 100m$^2$/g, and an electrolyte-wettable polymeric binder.

20 Claims, 19 Drawing Figures

Nickel Plated Steel Screen Current Collector

Manganese Dioxide Electrode

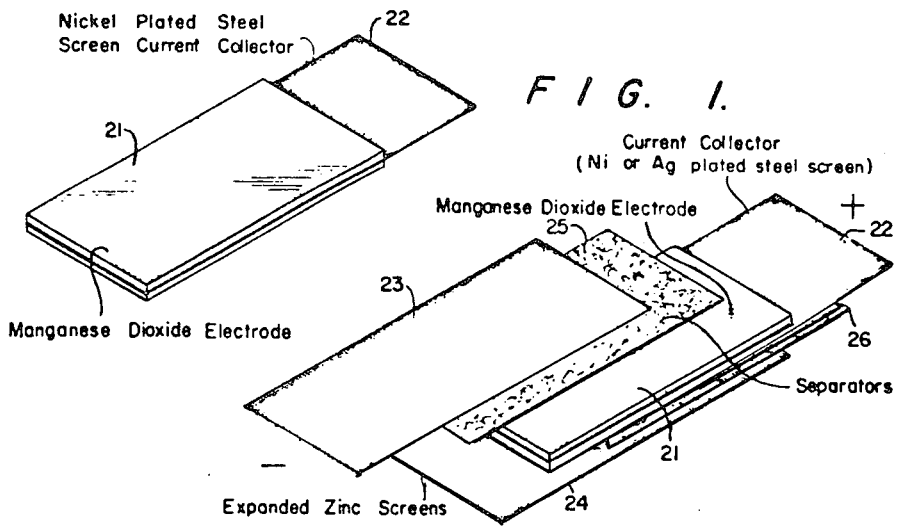
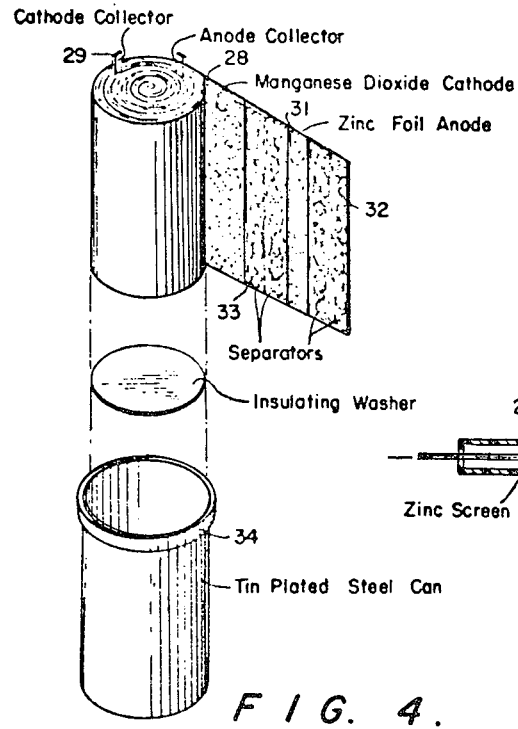
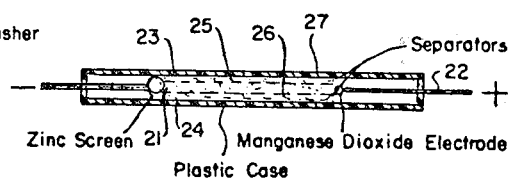

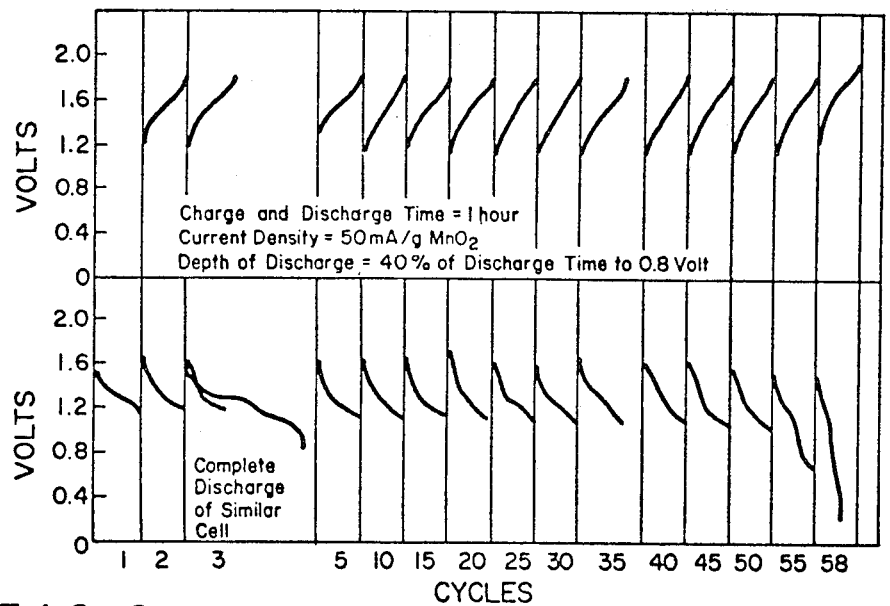
FIG. 9. CYCLING OF AN MnO₂/KOH/Zn CELL
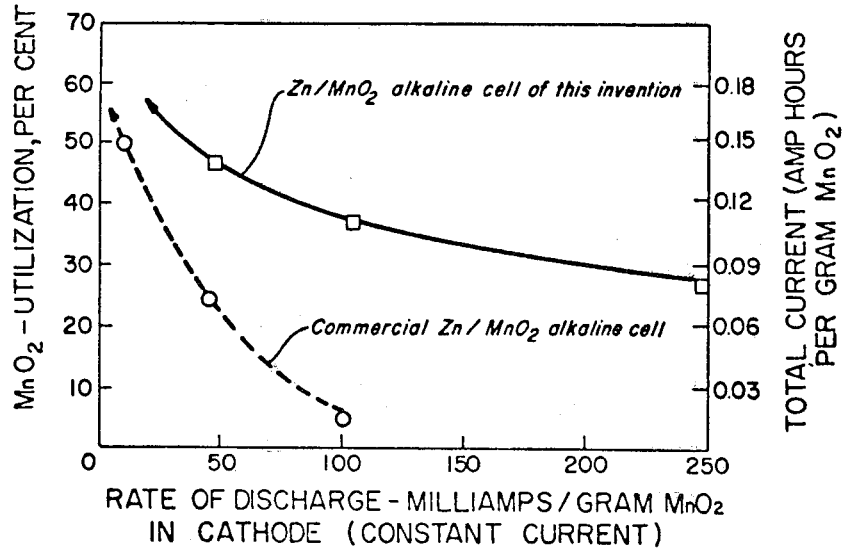
FIG. 5.

RECHARGEABLE ALKALINE ZINC-MnO$_2$ CELL (containing 2 cathodes and a powder zinc anode)

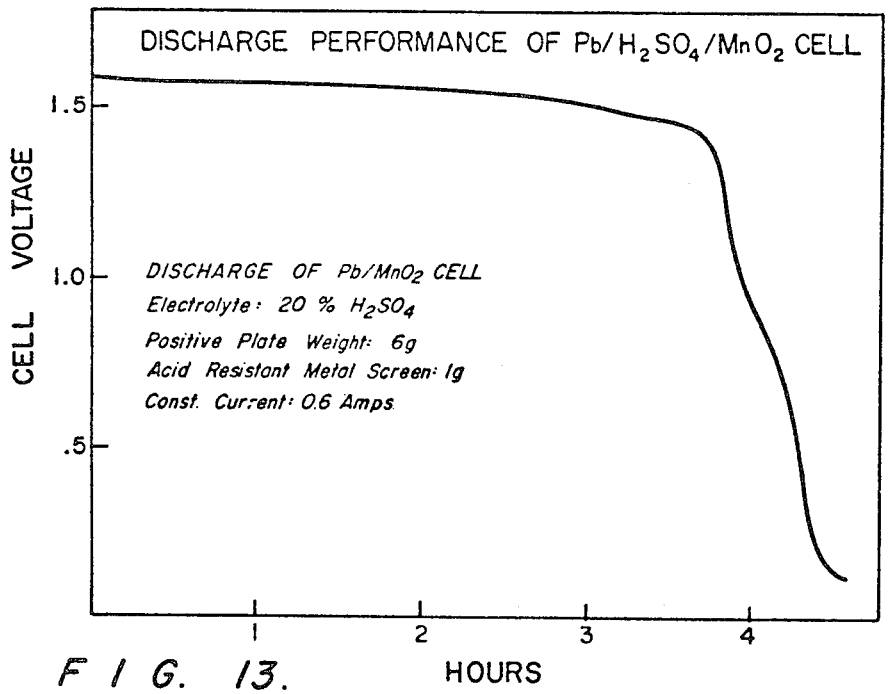
FIG. 13.
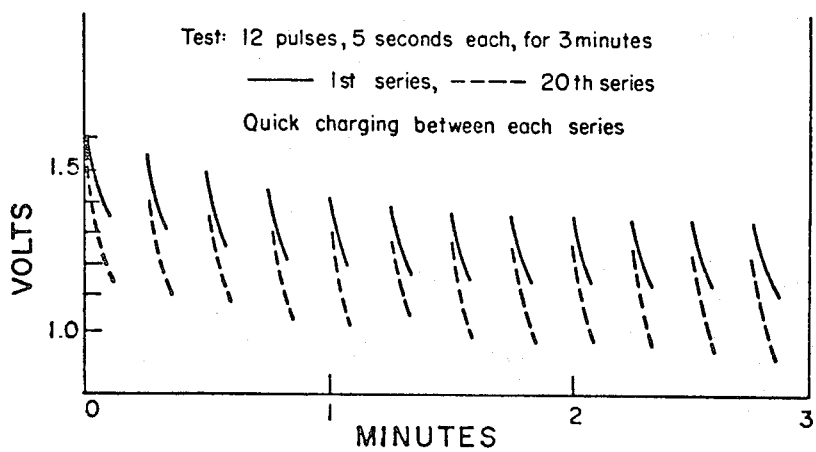
FIG. 14. 20 Ampere Pulsing of Cell of example 7
Recharging: 15 minutes at 1.7 Volt Constant Voltage

COHERENT MANGANESE DIOXIDE ELECTRODES, PROCESS FOR THEIR PRODUCTION, AND ELECTROCHEMICAL CELLS UTILIZING THEM

This is a continuation-in-part of application Ser. No. 212,908 filed Dec. 28, 1971 now abandoned.

The invention relates to coherent manganese dioxide electrodes, a process for their production, and electrochemical cells utilizing them.

Particulate manganese dioxide mixed with powdered carbon and/or graphite is widely used as a cathode material or depolarizer in commercial batteries. It is relatively inexpensive and it provides a satisfactory power output. However, it has been the experience in the battery making art that manganese dioxide cathode mixes could not be compressed into bodies having sufficient cohesive strength or density to be self-supporting when they are wetted by electrolyte. Therefore, manganese dioxide electrodes have been provided with some sort of mechanical support or restraint when used in contact with liquid aqueous electrolytes. Such mechanical supports include metal containers surrounding annular electrodes, and compression on a stack of flat electrodes. Without such support, manganese dioxide electrodes will disintegrate fairly rapidly in liquid electrolyte, particularly alkali solutions. Disintegration will occur with time even when a fairly good cathode binder such as Portland cement (taught in U.S. Pat. No. 2,962,540) is used. Mechanical support (e.g., a steel can surrounding the cathode) is still needed with cement binders. Cathode disintegration becomes even more of a problem if the electrode is employed in a rechargeable cell where it is subjected to charge-discharge cycling. Lattice expansion on discharge and contraction on charge, a phenomenon peculiar to manganese dioxide, further adds to the problem of electrode disintegration.

Because manganese dioxide electrodes lacked the necessary cohesive strength when contacted by electrolyte, heretofore it has not been feasible to employ manganese dioxide as a depolarizer in the form of an unrestrained thin layer, which is the most effective form for efficient electrochemical utilization of the active material present. Because of the disadvantages mentioned above, manganese dioxide has been employed commercially as the depolarizer only in electrochemical cells delivering low and medium discharge currents, despite the fact that it has been demonstrated experimentally that manganese dioxide has high current capabilities.

In U.S. Pat. No. 1,296,700 a depolarizing mixture is disclosed for Leclanche cells wherein part or all of the ordinary carbonaceous material used in a conventional manganese dioxide depolarizing mixture is replaced with colloidal graphite to produce a relatively wet and soft mix. This mix is suitable for use in Leclanche cells where the current requirements are low and where swelling of the mix due to excessive absorption of the electrolyte would not be fatal.

It is a principal object of the invention to provide manganese dioxide electrodes having improved cohesion, especially when exposed to aqueous electrolytes.

Another object of the invention is to provide coherent, thin manganese dioxide electrodes.

A further object of the invention is to provide manganese dioxide electrodes capable of high discharge rates.

Still another object of the invention is to provide a means for more efficient electrochemical utilization of manganese dioxide in electrochemical cells.

Another object of the invention is to provide electrochemical cells having improved stability to changes in temperature.

An additional object of the invention is the provision of electrochemical cells having improved performance at low temperatures.

Another object of the invention is to provide manganese dioxide electrodes which have improved retention of properties on charge-discharge cycling.

The invention provides a dense coherent electrode for use in an electrochemical cell having an aqueous electrolyte. The electrode is composed of particulate manganese dioxide ($MnO_2$) and particulate electrically conductive material both of which are substantially uniformly dispersed in a conductive binder composed of colloidal electrically conductive material having a surface area as defined by the B.E.T. method using $N_2$ absorption at 78°K of less than about 100m$^2$/g, and an electrolyte-wettable polymeric binder.

The particulate electrically conductive material is added to increase the electrical conductivity of the electrode since manganese dioxide is a relatively poor conductor, and then when the electrode is assembled in a cell, the conductive material will substantially reduce the internal resistance of the cell. The electrically conductive colloidal material is added to further increase the electrode conductivity of the electrode and to provide particle-to-particle electrical contact between the manganese dioxide particles thereby promoting better utilization of the available manganese dioxide so as to greatly reduce cathode polarization when the electrode is assembled in a cell.

Colloidal conductive material, as used hereinafter, shall mean material sized substantially in the range from about 1 m$\mu$ to about 200 m$\mu$ in diameter whereby 1 m$\mu$ equals $10^{-7}$ cm. The colloidal conductive particles for use in this invention are required to have a surface area as defined by the B.E.T. method using $N_2$ absorption at 78°K of less than about 100m$^2$/g; preferably between about 10 and 50m$^2$/g. The B.E.T. method is well known in the art and is referred to in the publication titled "The Structure and Properties of Porous Materials" edited by D. H. Everett and F. S. Stone, New York Academic Press Inc., Publishers-1958. This requirement of surface area for the colloidal particles is essential to insure that the finished electrode will not absorb large quantities of electrolyte when assembled in a cell which would result in excessive swelling and ultimate disintegration of the electrode. In addition, the surface area requirement of the colloidal material will aid in the fabrication of electrodes having a density in excess of about 2 ½ grams per square centimeter which is necessary for producing the relatively hard, well-bonded electrode of this invention. Moreover, the colloidal material is necessary to make the polymeric binder conductive since the binder by itself is non-conductive.

The particular polymeric binder for use in this invention must be capable of bonding the materials of the electrode together while not completely coating the manganese dioxide particles which would tend to diminish the high activity and capacity of the manganese dioxide particles. Moreover, the polymeric binder must be wettable by the electrolyte the electrode will contact in an assembled cell so that said electrode will absorb sufficient liquid electrolyte to maintain the necessary ionic contact with the active depolarizer material (manganese dioxide). For those binders that are initially solid, a volatile solvent should be used to dissolve such binders so that an intimate dispersion of the binder can be made with the electrode materials after which the solvent can be removed thereby aiding the development of desirable porosity in the finished electrode so that when said electrode is assembled in a cell, the electrolyte of the cell can be absorbed by the electrode thereby providing sufficient ionic contact between the electrolyte and the active depolarizer material. Since polymeric binders are electrically non-conductors of electricity, the colloidal conductive material is necessary so as to cause the binders to be conductive rather than insulative.

The principles of the invention will be described in detail hereinafter with reference to the accompanying drawings, wherein:

FIG. 1 is a perspective view of a flat manganese dioxide electrode embodying the principles of the invention;

FIG. 2 is an exploded perspective view of the elements of a cell embodying the principles of the invention, in unassembled condition;

FIG. 3 is a side sectional view of an assembled cell of the type shown in FIG. 2;

FIG. 4 is an exploded view of another type of cell embodying the principles of the invention;

FIG. 5 is a graph of rate of discharge versus per cent utilization of manganese dioxide and total capacity in a $Zn/KOH/MnO_2$ cell of the invention compared with a $Zn/KOH/MnO_2$ cell of the prior art;

FIGS. 9 and 10 are graphs showing the charge/discharge cycle performance of rechargeable $Zn/KOH/MnO_2$ flat cells constructed in accordance with the principles of the invention;

FIGS. 12 and 13 are graphs showing discharge time versus voltage of, respectively, $Mg/MgBr_2/MnO_2$ and $Pb/H_2SO_4/MnO_2$ wet cells of the invention;

FIG. 14 is a graph of high current drain pulsing performance of a $Zn/KOH/MnO_2$ cell of the invention;

Figure 6:
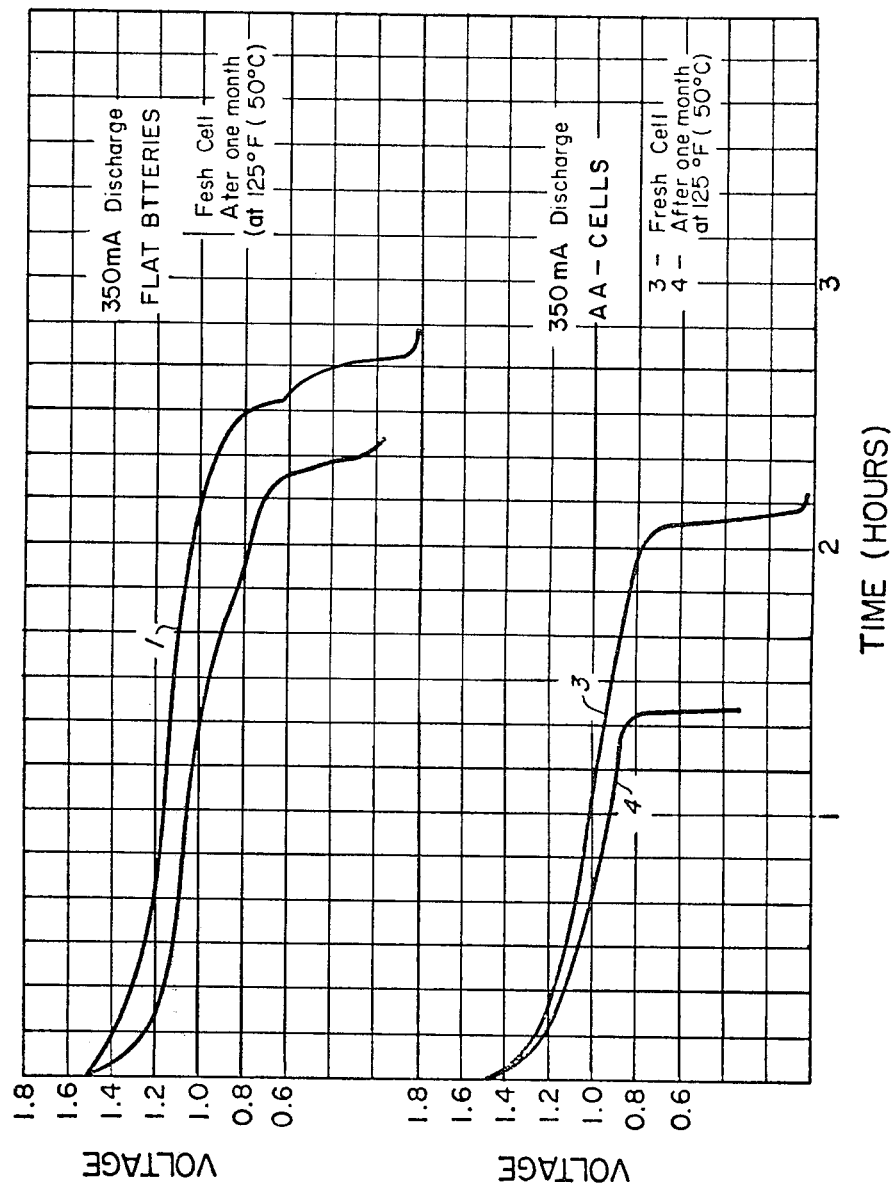
FIG. 6 is a graph of discharge time versus voltage for both freshly made $Zn/KOH/MnO_2$ flat cells of the invention and such cells after storage for one month at 125°F., and compares their performance with the performance of a commercial $Zn/KOH/MnO_2$ cell.

Referring first to the drawings, FIG. 1 shows a thin, flat manganese dioxide electrode 21 embodying the principles of the invention, and having a metal screen current collector 22 embedded therein. The method for fabricating the electrode will be described in detail hereinafter. FIGS. 2 and 3 show a flat cell utilizing a manganese dioxide electrode 21 of the type shown in FIG. 1. The cell includes a manganese dioxide electrode 21 disposed between two zinc screens 23 and 24, the manganese dioxide electrode 21 and the zinc screens 23 and 24 being separated by suitable separators 25 and 26, such as fibrous-reinforced regenerated cellulose. A suitable electrolyte is absorbed in the separators 25 and 26. The cell is contained in a case 27 made of a suitable plastic material such as polystyrene. In the charged condition, the manganese dioxide electrode 21 is the cathode, and the zinc screens 23 and 24 comprise the anode.

The principle of alternating a flat anode and a flat cathode separated by suitable separators and encased in a plastic case, as shown in FIGS. 2 and 3, can be employed to fabricate flat cells composed of at least two flat manganese dioxide electrodes and at least two flat metal electrodes, with the electrodes normally being connected in parallel.

In FIG. 4, one type of round cell utilizing the manganese dioxide electrodes of the invention is shown. The cell comprises, in the charged condition, a rolled manganese dioxide cathode 28 coated on a suitable wire screen current collector 29, and a zinc foil anode 31, the two electrodes being separated by a suitable separator such as one or two layers of modacrylic fibers 32 and 33. The rolled up electrodes are contained in a cylindrical steel can container 34. A suitable electrolyte is absorbed in the separators 32, 33.

Figure 15:
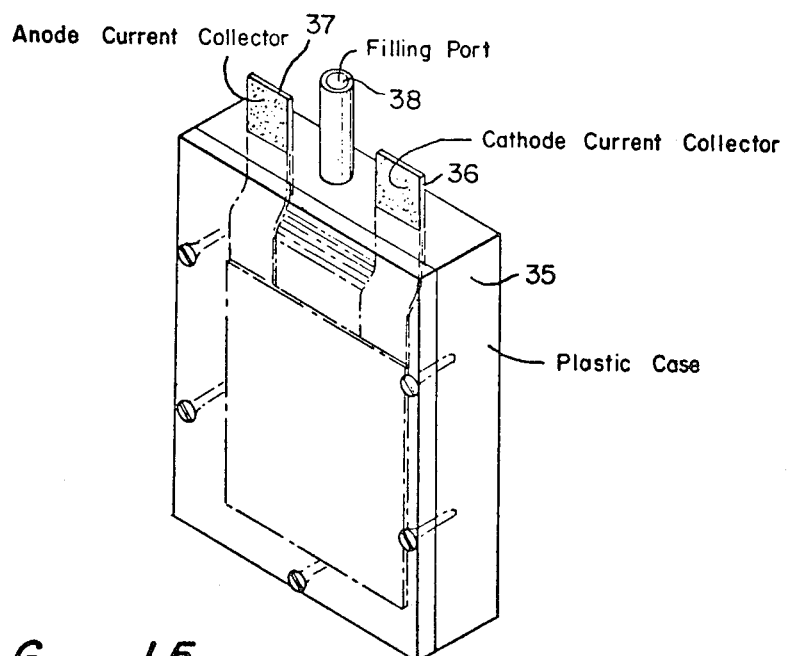
FIG. 15 is a perspective, partially schematic view of a unit cell embodying the principles of the invention, the electrodes being connected in parallel.

In FIG. 15, a unit cell is shown that is fabricated from a plurality of alternating flat manganese dioxide cathodes and pressed powdered zinc anodes, with the electrodes being connected in parallel and separated by suitable separators. The unit cell is contained in a plastic case 35, with the cathode current collector 36, the anode current collector 37, and a filling port 38 extending out of the top of the case 35.

Figure 16:
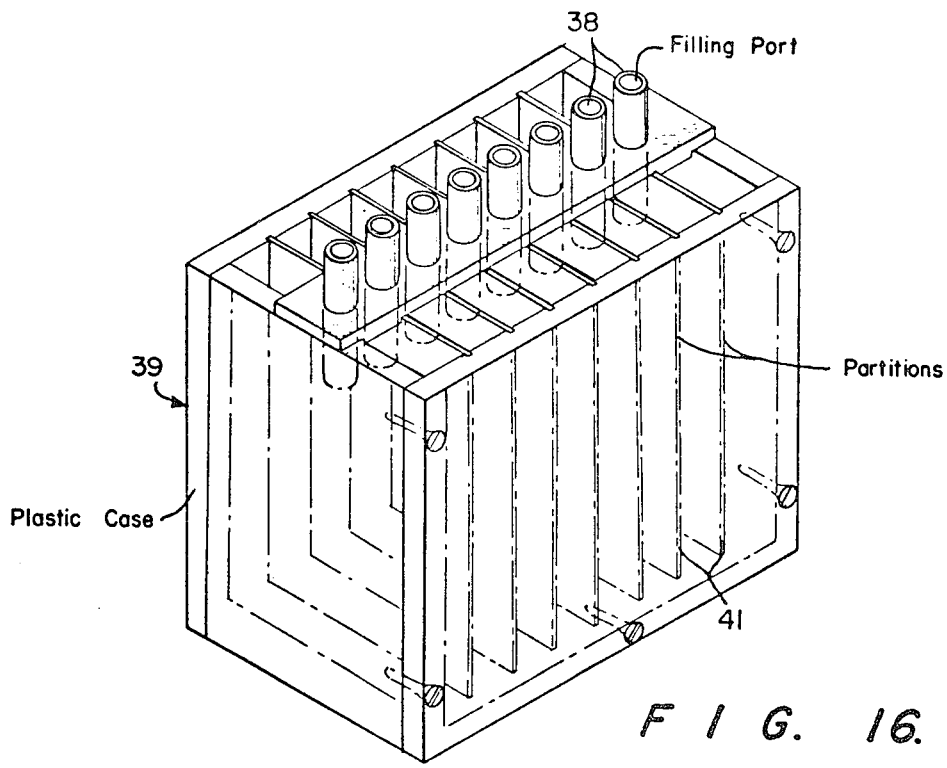
FIG. 16 is a schematic perspective view of a battery case designed to contain eight unit cells of the type shown in FIG. 15, connected in series.

FIG. 16 shows a battery case 39 that is designed to contain eight unit cells of the type shown in FIG. 15, connected in series. Each of said unit cells is contained in one of the compartments described by the partitions 41.

Figure 19:
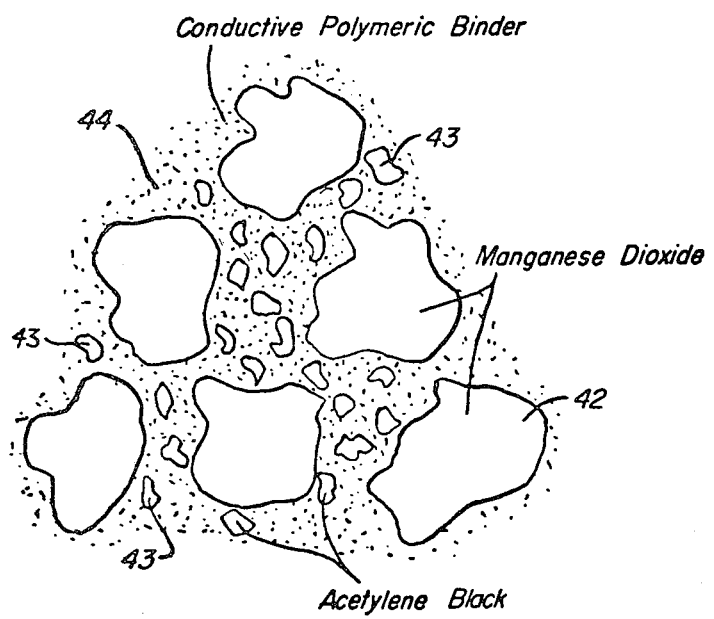
FIG. 19 is an enlarged, idealized cross-sectional view of a portion of a manganese dioxide electrode embodying the principles of the invention.

FIG. 19 shows an enlarged, cross-sectional view of a portion of a representative manganese dioxide electrode of the invention. As this drawing illustrates, particles of manganese dioxide 42 and heat treated carbon 43 (as the particulate electrically conductive material) are embedded in a porous matrix of a polymeric binder 44. The polymeric binder 44 contains colloidal graphite to render it conductive. The binder/colloidal graphite matrix serves two purposes: first, to mechanically bind the particles of manganese dioxide 42 and carbon 43 to render the electrode resistant to swelling when it is contacted by aqueous electrolyte; and second, to provide interparticle electrical contact within the electrode.

The manganese dioxide electrodes of the invention can be produced by a process which comprises:

mixing a polymeric binder, a colloidal electrically conductive material, particulate manganese dioxide, and particulate electrically conductive material, to produce a mixture; and forming said mixture into a coherent electrode.

To briefly illustrate the primary mode of carrying out this process, two grams of an epoxy resin (the diglycidyl diether of bisphenol A) plus amine hardener mixture is dissolved in 14 grams of an alcoholic (isopropyl alcohol) suspension of colloidal graphite to produce a conductive epoxy mixture. The polymeric binder, i.e., epoxy resin, would be non-conductive without the colloidal graphite and could probably insulate some of the manganese dioxide particles if it were mixed directly with the manganese dioxide. Consequently, the preferred method to employ is to first mix the polymeric binder with the colloidal conductive material so as to render the binder material conductive and thereby minimize the coating of the manganese dioxide particles with an insulating plastic binder which would restrict or limit the high activity and capacity of the manganese dioxide. A mixture containing 90 weight per cent particulate manganese dioxide and 10 weight per cent particulate electrically conductive material (8 per cent graphite powder plus 2 per cent carbon) is then mixed with the conductive epoxy/colloidal graphite mixture in the ratio of 30 grams of the manganese dioxide mixture to 12 grams of the conductive epoxy/colloidal graphite mixture. The mixture has a putty-like consistency, which makes it easy to spread on a metal screen current collector. Pressure may be used, if desired, to fill the holes in the screen more uniformly and to insure good contact between the mixture and the collector. The mixture on the screen support is then heated for about one half hour at about 50°C. in order to drive off the liquids present in the mixture and to harden the epoxy resin. The coherent electrode is then ready to be incorporated in conventional manner as an electrode in an electrochemical cell.

The polymeric binder that is employed in the invention is one that, in its ultimate form in the finished electrode, will permit the electrode to be wetted by the electrolyte to be used in the cell, but at the same time, the binder should not effectively absorb the electrolyte so that the electrode will be resistant to swelling by the electrolyte, which is the cause of weakness in prior art manganese dioxide electrodes. The term "wetted" refers to a surface condition in which the electrolyte is permitted to penetrate the pores of the electrode to achieve maximum ionic contact between the electrolyte and the active material in the electrode.

In addition to epoxy resins as exemplified above, the polymeric binder can be a polymer such as an acrylonitrile-butadiene-styrene (ABS) polymer, an acrylate polymer such as polymethyl methacrylate or other polymer of a lower alkyl (e.g., $C_1$ to $C_4$ alkyl) ester of acrylic or methacrylic acid, a melamine- or urea-formaldehyde polymer, a chlorinated polyether (i.e., a polymer having the recurring structural unit

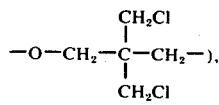

a polycarbonate, a phenol-formaldehyde polymer, a polysulfone, polystyrene and styrene copolymers with monomers such as acrylonitrile, a vinyl resin such as polyvinyl chloride, polyvinyl alcohol, or vinyl chloride-vinyl acetate copolymer, and a styrene-butadiene copolymer.

The polymeric binder can contain conventional additives such as stabilizers and plasticizers which are substantially inert in the electrochemical cell environment.

The binder selected should be stable in the electrolyte to be used in the cell in which the electrode will be employed. Thus, for instance, polyvinyl alcohol, ABS resins, urea/formaldehyde resins, and phenol/formaldehyde resins should not be employed in alkaline cells since they are not stable to alkali over extended periods of time. The stability of the polymeric binder toward the electrolyte is either known or readily determined by the worker in the art. Binders which are stable in alkaline electrolyte include polysulfone, acrylic polymers such as polymethyl methacrylate, epoxy resins, and polystyrene.

In forming the electrode mixture, it is preferred that the polymeric binder be in a liquid vehicle in order to facilitate thorough mixing of the ingredients of the electrode mix. Thus, it is desirable to employ the binder in solution, since most of the polymers are normally solid materials. Even in the case of epoxy resins, which are liquids prior to the hardening reaction, it is preferred to employ a solution because most epoxy resins are rather viscous at room temperature, and a solution of an epoxy resin is more readily mixed to form a uniform mixture than is the undiluted, viscous resin. As another alternative, the polymeric binder can be employed in the form of a powder, which can be dispersed in a liquid, if desired.

The liquid that is employed as a solvent or dispersant for the polymeric binder will depend somewhat on the nature of the polymeric binder. In addition to being either a solvent or a dispersant for the polymeric binder, the liquid should also be inert towards the electrode mix. For instance, the liquid should preferably not be readily oxidized by the manganese dioxide in the mix. Examples of such useful liquids include organic liquids such as isopropyl alcohol, tert-butyl alcohol, hexyl alcohol, and other alcohols. Other useful liquids include ketones such as acetone, methyl ethyl ketone, and methyl isobutyl ketone. Chlorinated hydrocarbons such as methylene dichloride, chloroform, trichloroethylene, perchloroethylene, and other solvents such as tetrahydrofuran are also useful in the invention. In many cases, it is useful to employ a mixture of liquids. The liquid employed must be volatile. As used herein, the term "volatile" means that the liquid is capable of substantially complete volatilization at moderate temperatures, for instance, at temperatures of up to 100°C.

Another component that is employed in the process of the invention is a colloidal electrically conductive material. Such electrically conductive materials include graphite, heat treated carbon, and metal powders such as silver and nickel powder. Not all carbon black materials are suitable for use in this invention. Some carbon blacks, such as channel blacks with high-surface coverage, possess high electrical resistivity and therefore they would not be effective in rendering the polymeric binder conductive. In addition, it is found that a low-temperature carbon has rather high chemical reactivity independent of surface area, while a carbon which has been treated at a high temperature above about 1000°C. is relatively non-reactive. This change in chemical reactivity is believed attributed to the increase in crystallite size and the reorientation of crystallites upon heat treatment of the carbon which yields a carbon surface composed increasingly of the basal plane of the crystallites. Thus the colloidal carbon to be used in this invention has to be heat treated at a temperature of above about 1000°C. to render it conductive and to insure that it has a surface area as defined by the B.E.T. method using $N_2$ absorption at 78°K of less than about 100m$^2$/g, and preferably between about 10m$^2$/g and about 50m$^2$/g. This dual requirement of the carbon will enable it to render the polymeric binder conductive so that the binder will provide excellent interparticle electrical contact between the manganese dioxide particles thereby promoting better utilization of the available manganese dioxide in the electrode during the operational mode of a cell. The requirement that the surface area be less than 100m$^2$/g is necessary to insure that the electrode will not absorb too much electrolyte in the cell and thereby be subject to swelling which is the cause of weakness in prior art manganese dioxide electrodes. In addition, when using colloidal graphite as the conductive material, the graphite will serve as a lubricant during electrode molding or extruding procedures thereby greatly reducing the friction encountered in handling abrasive manganese dioxide particles.

The colloidal electrically conductive material is preferably employed as a colloidal dispersion in a liquid. As is known in the art, the individual particles of the colloidal electrically conductive material are mostly of submicron size. The liquids that can be used as the dispersant for the colloidal electrically conductive material include those that were mentioned above as solvents or dispersants for the polymeric binder. Colloidal graphite is the preferred colloidal electrically conductive material, and it is preferably employed as a colloidal dispersion in a chlorinated hydrocarbon such as trichloroethylene or in an alcohol such as isopropyl alcohol.

The third principal component of the electrodes of the invention is particulate manganese dioxide. The known forms of particulate manganese dioxide customarily used in batteries can be employed in the invention. Such forms include natural ore (e.g., pyrolusite), chemically treated natural ore, electrolytic manganese dioxide, and chemically prepared manganese dioxide.

Particulate electrically conductive material, above micron size, is also employed in the manganese dioxide electrodes. These include heat treated carbon as defined above, powdered graphite and the like. As in the colloidal electrically conductive material, the surface area of the particulate electrically conductive material has to be less than about 100m$^2$g, preferably between about 10 and 50m$^2$/g as defined by the B.E.T. method using $N_2$ absorption at 78°K. This is required to insure that the material will be conductive and will not absorb too much electrolyte in the cell which would result in swelling of the electrode.

In the electrodes of the invention, the manganese dioxide is the electrochemically active material. The polymeric binder provides cohesive strength to the electrode and permits the electrode to be wetted by electrolyte. The particulate electrically conductive material serves a purpose analogous to a principal purpose of the carbon or powdered graphite in the known manganese dioxide depolarizer mixes. That purpose is to improve the electrical conductivity of the electrode. The colloidal electrically conductive material is employed to overcome a problem associated with the use of the polymeric binder in the electrode. The binder tends to coat the particles of manganese dioxide and particulate electrically conductive material. Since the polymers that are employed as binders are non-conductors of electricity, in the absence of the colloidal electrically conductive material, the binder would tend to form an insulative coating around the individual particles of both the manganese dioxide and the particulate electrically conductive material. The colloidal material overcomes this tendency and ensures particle-to-particle electrical contact within the electrode. Stated another way, the colloidal material, when mixed with the polymer, causes the binder to be conductive rather than insulative.

As a general rule, the colloidal electrically conductive material, the polymeric binder, and the particulate electrically conductive material, are all preferably used in the minimum amounts that can be employed and still effect the above-mentioned purposes. This is because it is desirable to have as large a proportion of manganese dioxide in the electrode as possible in order to provide the maximum service in ampere-hours capacity per unit weight of cell.

As a general rule, the minimum amounts of components that can be used and still effect the desired purposes are the following:

Colloidal electrically conductive material — about 1 to 2 weight per cent
Particulate electrically conductive material — about 5 to 10 weight per cent
Polymeric binder — about 1 to 2 weight per cent The remainder of the electrode is manganese dioxide. (Percentages are based on weight of finished electrode, not including the current collector.) As can be seen from the above percentages, manganese dioxide can constitute at least 85 or 90 weight per cent of the electrode mix, and will normally constitute at least about 70 weight per cent of the electrode mix. Manganese dioxide electrode mixes in commercial use today generally contain a maximum of about 70–80 weight per cent manganese dioxide.

The above described ingredients are employed in making cohesive manganese dioxide electrodes. The components are first thoroughly mixed together to form a mixture. It is preferred to first mix the polymeric binder and the colloidal electrically conductive material, and then add the remaining components. This helps to ensure that optimum electrically conductive contact will be made between the colloidal electrically conductive material and the particles of manganese dioxide and particulate electrically conductive material with a minimum of time being expended in the mixing operation. Also, it effectively eliminates the binder from forming an insulative coating around the individual particles of both the manganese dioxide and the particulate electrically conductive material.

The type of mixing employed in making the mixture is not critical. Simple stirring until the ingredients are substantially uniformly mixed will be sufficient in most cases.

The mixture is then formed into an electrode. In most cases, it is desirable to form the electrode by coating a current collector such as a metal or carbon screen or fabric with the mixture, which will normally be in the form of a relatively thick paste. Conventional coating or spreading techniques can be employed. In one desirable aspect of the invention, the electrode is formed by forming a laminate or sandwich of two current collector screens or fabrics having the mixture between them. This helps to eliminate problems that may occur from gassing if the cell is overcharged. Pressure is desirable in many cases in order to improve the contact between the mixture and the current collector. If desired, the current collector can be coated with a material such as a lubricating graphite, sintered metal powder, or electroplated silver in order to improve the electrical contact between the electrode mixture and the current collector screen. The current collector can be made from any suitable material that is inert in the system. Steel, nickel, carbon, silver, and nickel-or silver-coated steel are examples of current collectors that can be employed.

The liquids that are present in the electrode mix are removed after the electrode has been shaped or given its final form. They can be removed from the mixture simply by air drying, although in many cases moderate heating is desirable. Moderate heating is also desirable for effecting a hardening reaction if the polymeric binder is a thermosetting resin such as an epoxy resin system. While epoxy resins often can harden at room temperature, the hardening is considerably speeded up by heating. One-half to about 1 hour at about 40° to 50°C. can be used as the heating step.

In order to improve the contact of the electrode mixture with the current collector, and to eliminate bubbles from the mixture, the electrode can be pressed in a press prior to the drying step. Pressures of from a few hundred to several thousand psi are suitable.

Before the liquids have been completely removed from the mixture, and before any hardenable resins have been cured, the electrodes of the invention can be shaped into many different physical shapes. For instance, they can be rolled up into a spiral, they can be bent, or they can be simply produced in the form of flat electrodes.

One of the important aspects of this invention is that the coherent manganese dioxide electrodes can be made in the form of thin layers. Thus, flat manganese dioxide electrodes having thicknesses of from about 10 to about 50 mils can be fabricated employing the principles of the invention. The importance of this aspect of the invention resides in the fact that thin electrodes provide a means for efficient electrochemical utilization of the active material present, and for the fabrication of cells delivering unusually high rates of discharge with relatively efficient utilization of the manganese dioxide. All of the electrodes of the invention, thin or otherwise, can be employed in rechargeable cells having prolonged cycle life.

The electrodes of the invention are porous. The porosity is such that the electrode will absorb from about 20 to about 40 weight per cent (based on weight of electrode) of electrolyte. The porosity is achieved, in most cases, by the evaporation of the liquid used in formulating the mix. If no volatile liquids are used in formulating the electrode mix, then porosity is achieved by other means known to the art, such as by including in the mix a compound that can be decomposed to gaseous components at low temperatures. Ammonium carbonate is an example of such a compound.

The manganese dioxide electrodes of the invention are incorporated in electrochemical cells by known procedures. The electrodes can be employed as cathodes with known types of anodes such as zinc, magnesium, cadmium, aluminum, and lead anodes. Either aqueous alkaline or aqueous acid electrolytes can be employed, depending on the type of cell desired and, in some cases, the nature of the anode.

In the Examples, the generalized procedure set forth below as Method 1 was employed, unless otherwise indicated.

METHOD 1

Current Collector

A 5-mil thick, annealed, nickel plated steel screen is employed as the current collector. In order to improve the adhesion of the electrode mix to the screen, it is desirable to employ a primer. The primer contains conductive material such as colloidal graphite and a polymer that will be softened by the solvent contained in the electrode mix. The following formulations are useful as primers for electrode mixes containing polymethyl methacrylate and polysulfone, respectively:

Primer 1:
  5 grams polymethyl methacrylate
  100 milliliters solvent (trichloroethylene, chloroform, dichloromethane or mixtures thereof)
  300 grams colloidal graphite suspension containing 10 weight per cent graphite in trichloroethylene Primer 2:
  10 grams polysulfone (PRDA-8030, Union Carbide Corporation)
  100 milliliters dichloromethane
  300 grams colloidal graphite suspension (The colloidal graphite that is employed in the Examples, unless otherwise indicated, is a commercial product marketed under the trade name "DAG No. 155", by the Acheson Colloids Division of Acheson Industries, Inc., Port Huron, Mich.)

In addition to the use of a primer to improve adhesion to the screen, high current performance of the electrode is improved by silver plating the nickel-plated screen prior to priming. Only a very thin coating of silver (a silver "strike") is used.

Manganese Dioxide Formulation

Electrolytic manganese dioxide is employed. The particulate electrically conductive material employed is powdered graphite having a particle size such that it pass through a screen having 200 meshes per inch (U.S. Standard Sieve Series). It is a commercial product marketed under the trade name "Dixon Air-Spun Graphite, Type 200-09", by Joseph Dixon Crucible Company, Jersey City, N.J. In some cases, modacrylic fibers or carbon fibers are added to the electrode mix to improve cohesion. In cases where the electrode mix to improve cohesion. In cases where the electrode mixture needs to have improved conductivity and/or hydrogen absorption properties, $Ag_2O$ is added. The following manganese th dioxide formulation is useful:

Manganese Dioxide Formulation:
  1000 grams electrolytic manganese dioxide
  100 grams Powdered graphite
  20 grams modacrylic fibers, ⅛-inch long (optional)
  10 grams $Ag_2O$ (optional)

Binder Formulations

The polymeric binder formulations employed were the following:

Polysulfone Formulation:
  10 grams 10 weight per cent polysulfone solution in dichloromethane and/or trichloroethylene
  10 grams colloidal graphite suspension, 10 weight per cent in trichloroethylene (This formulation is preferably prepared on the day it is used.)

Polymethyl Methacrylate Formulation:
  10 grams of 5 weight per cent polymethyl methacrylate solution in chloroform dichloromethane, and/or trichloroethylene
  10 grams of 10 weight per cent colloidal graphite suspension in trichloroethylene (This formulation preferably is prepared just prior to its intended use, e.g., within about one-half hour.)

Electrode Mixes

The following formulations are typical of the electrode mixes employed in The Examples:

Polysulfone spreadable mix:
  30 grams manganese dioxide formulation
  18 grams polysulfone formulation Polymethyl methacrylate spreadable mix:
  30 grams manganese dioxide formulation
  18 grams polymethyl methacrylate formulation After the spreadable mix is spread onto the primed screen, the electrode is placed between plates using absorbent paper as an intermediate layer between the electrode and the plates. The electrode is pressed at 5000 psi for 1 minute, and the pressure is then raised to 10,000 psi for one minute. The electrode is then dried in open air to remove the volatile solvents. If the organic liquid used is all or predominantly trichloroethylene, heating for about 1 hour at 40°C. is desirable to remove all of the liquid.

If the electrode is to be shaped, for instance by rolling into a spiral configuration, this shaping is done after the pressing but before the drying.

The dried plates have a thickness of 25 to 30 mils when the spreadable mix is applied in a thickness of 100 mils. The dried plates have a weight of about 1.5 grams/square inch (including the single metal screen current collector, which weighs 0.2 grams/square inch).

The polysulfone-containing electrode described above contains about 80–85 weight per cent manganese dioxide, about 9–10 weight per cent powdered graphite, about 2.5–3.0 per cent polysulfone, and about 2.5–3.0 per cent colloidal graphite. The polymethyl methacrylate-containing electrode contains about 82–87 weight per cent manganese dioxide, about 9–10 per cent powdered graphite, about 1.2–1.5 per cent polymethyl methacrylate, and about 2–3 per cent colloidal graphite.

METHOD 2

The following is an alternate procedure for producing the cohesive manganese dioxide electrodes of the invention:

1. Conductive Polymeric Binder:
  100 grams of a 10 weight per cent polysulfone solution (using 60 per cent trichloroethylene and 30 per cent chloroform as solvents) is mixed with 100 grams of 10 weight per cent colloidal graphite suspension in trichloroethylene.

2. Conductive Polymeric Binder Plus Powdered Graphite:
  Mix 200 grams of powdered graphite with enough trichloroethylene to obtain a paste; then add 200 grams of conductive polymeric binder and mix well. Place in a well-vented oven at 70°C. and allow mixture to dry. Remove the mixture from the oven and grind to a powder.

3. Partially and Conductively Bonded Graphite Plus Manganese Dioxide:
  Mix 150 grams of the powder obtain in the step immediately above with 850 grams of electrolytic manganese dioxide. The said powder and manganese dioxide must be thoroughly mixed.

4. Rebonding (tacking) of Mix:
  Spray into mixture obtained from step 3 (while mixing) a fine spray of trichloroethylene until mix is damp. Then without allowing mix to dry, prepare molded cathodes, using 600 psi pressure, by procedures analogous to those described above in Method 1.

5. Solvent Removal:
  Place cathodes in well-vented oven for 15 minutes at 50°C. to dry.

(This procedure can be used only when a normally solid binder is used that can be re-softened or re-dissolved by the addition of a small amount of solvent in the 4th step.)

EXAMPLE 1

One of the advantages that can be obtained by practicing the invention is the preparation of thin electrodes which are very efficient in their utilization of the manganese dioxide in the electrode. This example illustrates the efficient utilization of the manganese dioxide in a thin electrode constructed in accordance with the invention.

A flat cell was constructed similar to the one shown in FIGS. 2 and 3, and having two 5 mil thick expanded zinc anodes and one manganese dioxide cathode constructed as set forth above (Method 1) using polymethyl methacrylate as the binder. (Silver oxide was omitted from the manganese dioxide formulation). The cathode was 25 mils thick, was about 1.5 square inches in area (about 10 square cm), and contained about 2.0 grams of the cathode mix (80 weight per cent manganese dioxide). The electrolyte was 9 N aqueous KOH.

The cell described above and many others similarly constructed, which had initial closed circuit voltages of about 1.4 volts, were discharged at various constant current rates until the voltage dropped to 1.0 volt.

Figure 11:
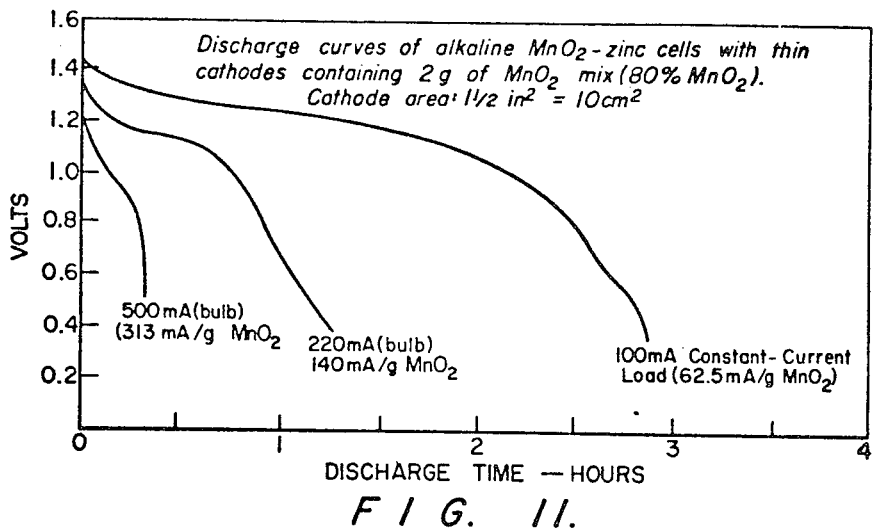
FIG. 11 is a graph showing discharge time versus voltage of $Zn/KOH/MnO_2$ cells of the invention at various current densities.

The discharge time of these cells was plotted against cell voltage at various constant discharge current densities and compared on the basis of milliamperes per gram of manganese dioxide, as shown in FIG. 11. As a specific illustration, a thin manganese dioxide cathode containing 1.6 grams of manganese dioxide (80 per cent of 2 grams of mix) delivers about 2.2 hours of service at 0.1 ampere (62.5 mA per gram of manganese dioxide) constant current to a 1.0-volt cutoff, corresponding to 0.22 ampere-hour (see 100 mA curve in FIG. 11). Theoretically, this electrode should have delivered 0.496 ampere-hours service. (0.496 = 1.6 × 0.31 — Assuming that the cell reaction involves conversion of $MnO_2$ to $Mn_2O_3$ on discharge of a cell, and that such conversion is complete, one gram of manganese dioxide yields about 0.31 ampere-hour of electricity.) The efficiency of manganese dioxide utilization in this electrode (to 1.0-volt cutoff) is therefore about 45 per cent.

FIG. 5 compares the average efficiencies of thin manganese dioxide cathodes of this invention contained in flat cells of the type described above, with the average efficiencies (in utilizing manganese dioxide) of commercial D-size alkaline round cells, each of the latter having 35 grams of manganese dioxide in the cathode shell molded inside the steel container. The current drain for cells containing this type of manganese dioxide cathode corresponding to a drain of 62.5 mA/gram manganese dioxide would be 2.2 amperes (35 × 0.625). According to experimental testing, this cell averages such service (i.e., constant current drain of 2.2 amperes) for 0.7 hour, corresponding to 1.54 ampere-hours. The theoretical value would be $35 \times 0.31 = 10.85$ ampere-hours. The average efficiency of utilization of manganese dioxide in this cell is thus about 14 per cent. The cutoff voltage used in this comparative test was 0.7 volt for the commercial cell (at 2.2 amperes), since the voltage drop owing to its internal resistance is higher than that of the thin, flat cathode of this invention. The 1.0-volt cutoff was still used for the thin cathode of the invention. It should be further noted in FIG. 5 that at still higher rates of discharge, the average efficiency of manganese dioxide utilization in the commercial cell dropped off drastically compared to that observed with the thin electrodes of this invention.

This Example demonstrated the extraordinary efficiency in utilizing the electrochemical energy of manganese dioxide that is a feature of the thin electrodes of the invention. Thus, the thin manganese dioxide electrodes of the invention are capable of utilizing at least 25 per cent, and in many cases at least 35 per cent, of the electrochemical energy of manganese dioxide at a constant rate of discharge of 100 mA (milliamperes) per gram of manganese dioxide vs. a zinc reference electrode using 9 N aqueous KOH as the electrolyte, before the voltage drops under about 0.9 volt. The electrochemical energy of manganese dioxide as used herein refers to the theoretical amount of electricity, in ampere-hours, that would be obtained upon complete conversion of $MnO_2$ to $Mn_2O_3$ on discharge of the cell.

EXAMPLE 2

The electrodes constructed in accordance with the principles of the invention are relatively stable to extremes of temperature, both hot and cold. This example illustrates this advantage.

In this Example, flat cells having alternating flat anodes and cathodes (as illustrated in FIGS. 2 and 3) connected in parallel were employed. These flat cells each contained three thin, flat manganese dioxide cathodes prepared as described above (Method 1). Each cathode contained 2 grams of cathode mix (about 1.6 grams of manganese dioxide), and each was about 1.5 inches in area. The four anodes were zinc, the electrolyte was 9 M aqueous KOH, and the separators were fibrous reinforced regenerated cellulose.

The performance of the flat cells after storage at high temperature (125°F., or about 50°C.), and at lower temperatures (0°C. and −12°C.) was evaluated and compared with the performance of commercial AA size $MnO_2$/zinc alkaline cells, which are comparable in volume to the flat cells of this Example. The cells of the invention weighed 16–19 grams each, compared with 24 grams each for the commercial AA cells, including the steel cans. The flat cells each contained about 6 grams of manganese dioxide, and the AA cells each contained about 7 grams of manganese dioxide.

The flat cells and the commercial AA cells were discharged at a constant current of 350 mA at room temperature, both as produced and after storage at 125°F. for 1 month. The results of these tests are shown in FIG. 6, in which voltage against time is plotted. After storage for 1 month at 125°F., the flat cell of the invention retained a significantly higher proportion of the original performance than did the commercial AA alkaline cell.

Figure 7:
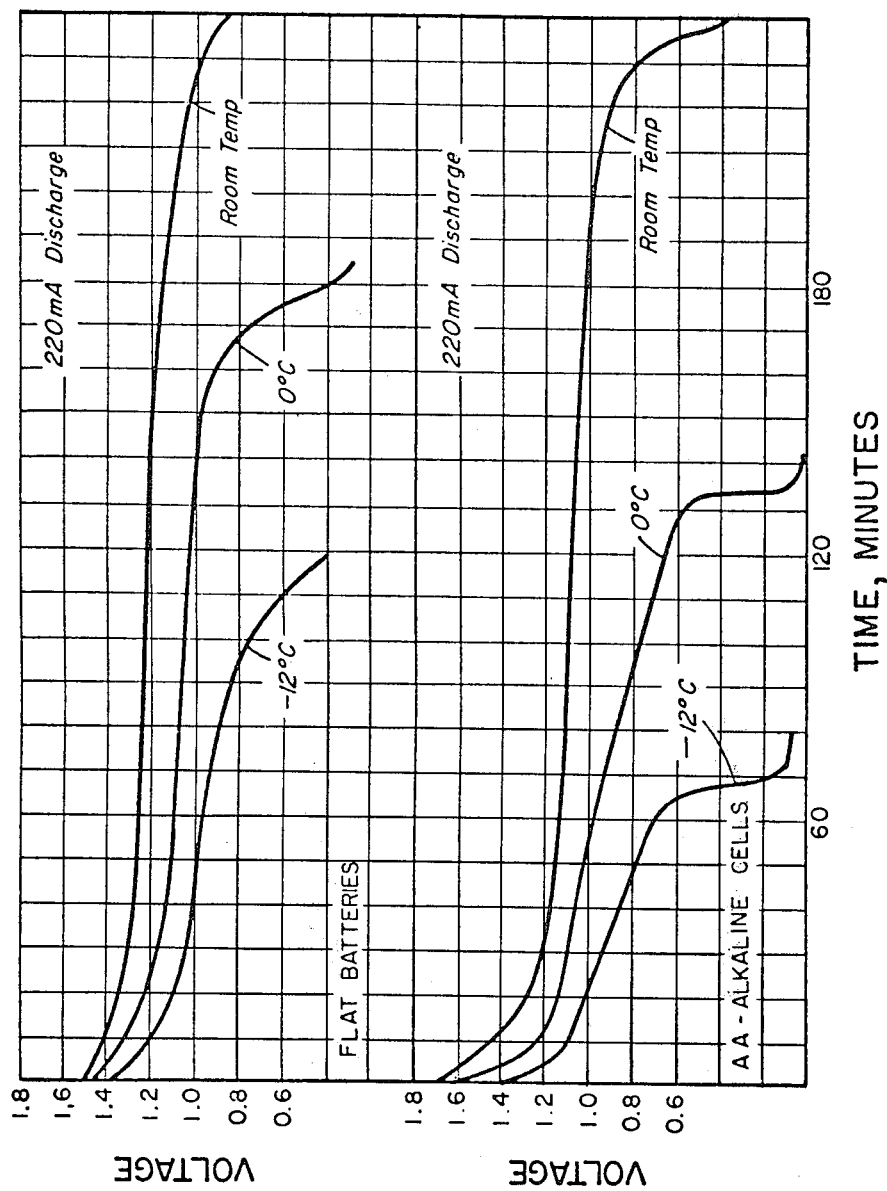
FIG. 7 is a graph of discharge time versus voltage for $Zn/KOH/MnO_2$ flat cells of the invention and of commercial $Zn/KOH/MnO_2$ cells, at room temperature, at 0°C., and at −12°C.

The flat cells of the invention and the commercial AA cells were discharged at a constant current of 220 mA at room temperature, at 0°C., and at −12°C., and the voltage against time was plotted. The results are displayed in FIG. 7. The low temperature performance of the flat cell of this invention is significantly better than that of the commercial AA cell, despite similar room temperature performance.

EXAMPLE 3

The cells of the invention can be employed as secondary or rechargeable cells. The following two experiments illustrate the rechargeability of the cells of the invention:

A. $MnO_2$/KOH/Cd Cell.

Figure 8:
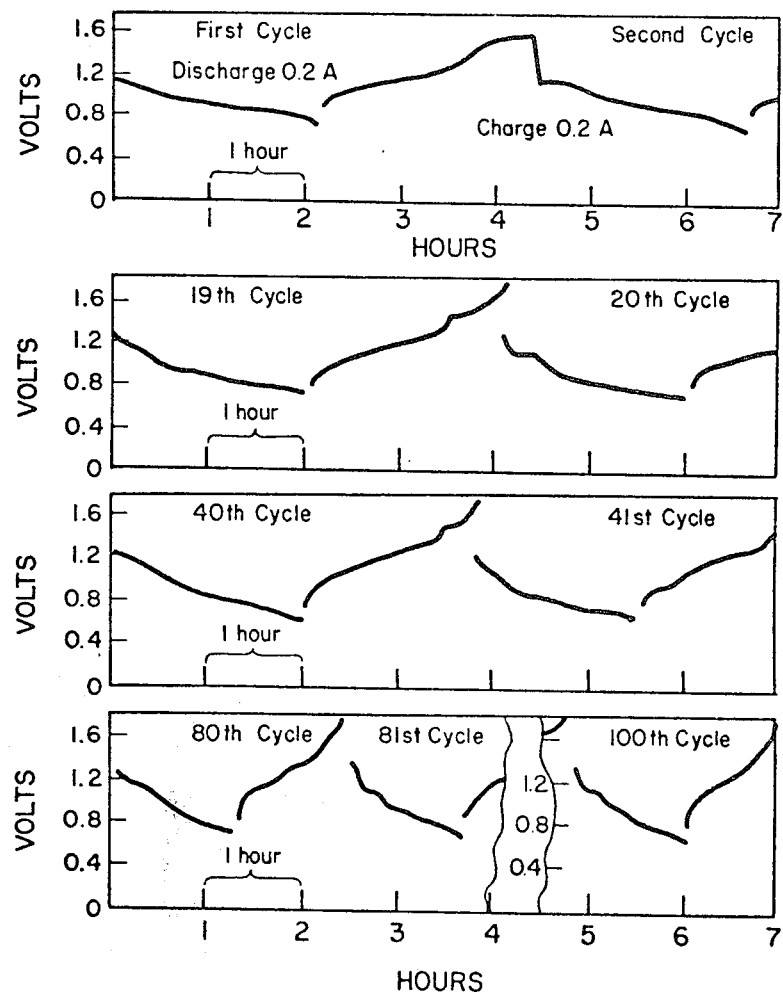
FIG. 8 is a graph showing the charge/discharge cycle performance of a rechargeable $Cd/KOH/MnO_2$ flat cell constructed in accordance with the principles of the invention.

A flat cell having alternating anodes and cathodes (as illustrated in FIGS. 2 and 3) connected in parallel was fabricated from two thin manganese dioxide cathodes made in accordance with the description above (Method 1), three commercial cadmium anodes, and 9 M aqueous KOH as the electrolyte. The cathodes each weighed 2.2 grams (about 1.6 grams manganese dioxide) and were 1.5 square inches in area. The cell was discharged and charged at a constant current of 0.2 ampere over a number of cycles, with charge beginning when the cell was discharged to 0.8 volt and continuing until 1.5 volts was reached. The cathode current density was 10 mA/cm² and the rate of discharge was 50 mA/gm of cathode mix. FIG. 8 shows the cycling performance through the 100th cycle. At the voltage settings employed, during the first 40 cycles the cell reached a depth of discharge of about 75 per cent. As the cycling continued, the level of discharge decreased to about 50 per cent.

The cell delivered a total of 180 cycles, but beyond 130 cycles the internal resistance increased and the charge acceptance decreased below practical levels.

B. $MnO_2$/KOH/Zn Cell.

A cell was fabricated from a thin manganese dioxide cathode as shown in FIG. 1, and made by the procedure described above (Method 1), a gelled zinc powder anode, and 9 M aqueous KOH electrolyte. The cathode weighed 2 grams (about 1.6 grams manganese dioxide), and was 1 square inch in area. The electrodes were separated by two layers of regenerated cellulose. Discharge and charge time for the cell was 1 hour at 0.1 ampere constant current.

FIG. 9 displays the charge-discharge cycling performance of this cell through 58 cycles at a constant current density of 50 mA/gram of manganese dioxide (the charge and discharge current was 0.1 ampere). The useful life of this cell was about 55 cycles under the conditions tested. The cathode then exhibited low charge acceptance and zinc dendrite formation occurred.

Figure 10:
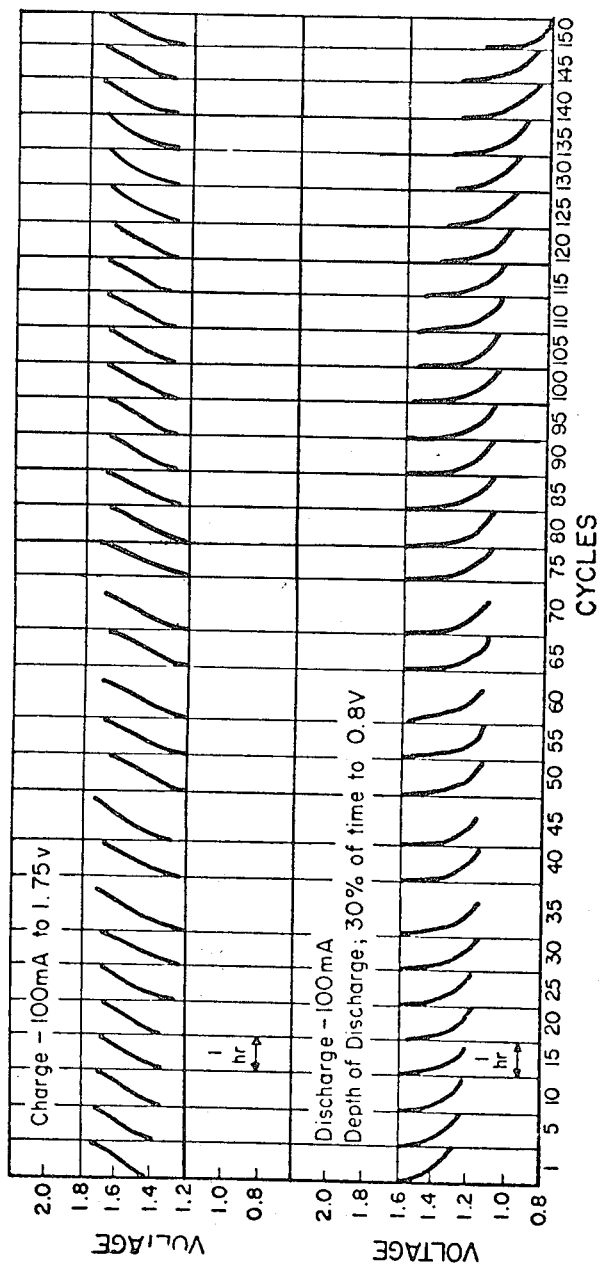

With a lower rate of discharge, for instance 25 mA/gram of manganese dioxide, many more cycles can be obtained. For instance, FIG. 10 shows the cycling performance of a cell similar to the one described above, but which had two thin manganese dioxide cathodes connected in parallel instead of one. (The anode was between the cathodes, in a manner analogous to that shown in FIGS. 2 and 3.) The charge and discharge currents were the same, 0.1 ampere. A rate of discharge of 25 mA/gram of manganese dioxide in the cathode mix would correspond to a current of about 1.0 ampere in a D-size cell. The maximum recommended discharge current for a typical commercial D-sized rechargeable $MnO_2/KOH/Zn$ cell is 0.625 ampere. This comparison provides an illustration of the high performance capabilities of the cells of the invention.

This Example illustrated the long cycle life that can be obtained with rechargeable cells utilizing the manganese dioxide electrodes of the invention. As a general rule, rechargeable cells utilizing the manganese dioxide electrodes of this invention will be able to undergo at least 150 charge-discharge cycles when discharged to 30 per cent of full discharge at a constant rate of discharge of 100 mA per gram of manganese dioxide, before cathode failure occurs. Cathode failure will take the form of poor charge acceptance, increase in resistance, or the like.

EXAMPLE 4

Flat Rolled-up ("Jelly Roll") Alkaline $MnO_2$-Zn Cell

A C-size primary alkaline-zinc round cell (of the type shown in FIG. 4) was fabricated using a zinc foil anode, a modacrylic fiber separator, and a polymethyl methacrylate-bonded manganese dioxide cathode coated and pressed on a screen (Method 1), rolled up in a spiral (jelly roll), and inserted in a steel container. The electrolyte was 9 N KOH containing 1 per cent by weight ZnO. The binder concentration in the cathode mix was 2 per cent by weight. Cathode dimensions were 8 inches in length by 1¼ inches in width by 0.020 inch thickness. Anode dimensions were comparable.

In comparison with a D-size commercial alkaline cell, the smaller C-size cell of this invention showed superior discharge performance in that it was capable of supporting 4 amperes constant current for nearly 1 hour while the commercial cell failed within 10 minutes on the same drain. (In both cases, 1.5 volts was the initial voltage and 0.8 volts the cutoff voltage.)

A rolled-cathode manganese dioxide-zinc cell of this type is comparable in power output to the same size Ni-Cd cell having a rolled, sintered nickel oxide cathode. The manganese dioxide cell actually surpasses the Ni-Cd cell in initial capacity and performs far better after storage at elevated temperatures.

This and other Examples demonstrate the high rate of discharge capability that is a feature of cells utilizing the thin manganese dioxide electrodes of the invention. Thus, the thin electrodes of the invention are capable of discharging above about 0.9 volt at a constant current rate of at least 250 mA per gram of manganese dioxide vs. a zinc reference electrode using 9 N aqueous KOH as the electrolyte. At this high discharge rate, the thin manganese dioxide electrodes of the invention are capable of utilizing at least about 15, and in some cases at least about 20, per cent of the electrochemical energy of the manganese dioxide contained in the electrode.

EXAMPLE 5

$Mg/MgBr_2/MnO_2$ Cell (90% $MnO_2$ in Mix)

Figure 12:
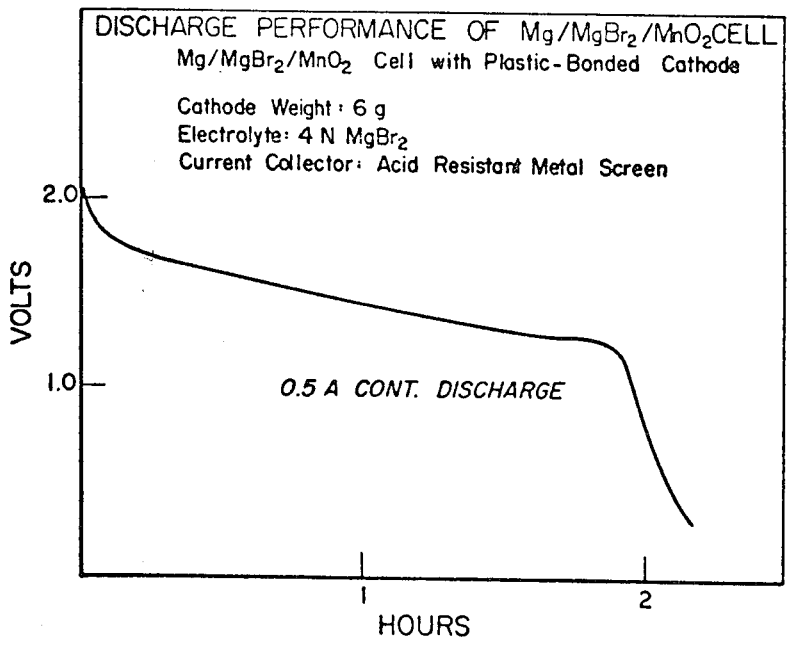

A $Mg/MgBr_2/MnO_2$ wet cell was made up using a Mg plate anode, aqueous 4 N $MgBr_2$ electrolyte, and two thin manganese dioxide cathodes (of the type shown in FIG. 1) made with the $Ag_2O$-containing formulation described above in Method 1, except that 60 grams of powdered graphite was used instead of 100 grams. Polymethyl methacrylate was the binder. Discharge performance on a 0.5-ampere continuous drain is shown in FIG. 12.

EXAMPLE 6

$Pb/H_2SO_4/MnO_2$ Cell

A wet cell of this invention was assembled with 20 weight per cent aqueous $H_2SO_4$ as electrolyte, a lead anode from a commercial lead-acid battery, and two thin manganese dioxide cathodes (FIG. 1) of the same mix composition described in Example 5, except that a polysulfone binder was substituted.

Discharge performance on a 0.6-ampere constant current drain is shown in FIG. 13.

EXAMPLE 7

High Current Drain Performance

The behavior of thin bonded $MnO_2$ cathodes at extremely high current outputs was studied in a four ampere-hour, box-type cell (FIG. 15) in pulse tests (described below) simulating the cranking of an engine.

This cell contained six thin manganese dioxide cathodes and seven gelled zinc powder anodes connected in parallel, each electrode measuring 2 × 2¼ × 0.020–0.025 inch (thickness) in size. The six cathodes (made in accordance with the formulation described in Method 1) contained a total of 21 grams of manganese dioxide with 9 grams of conductive material and binder (2 per cent by weight polysulfone). The seven anodes contained a total of 20 grams of zinc powder and 10 grams of starch-gelled 9 N KOH electrolyte pressed into tinplated copper screen current collectors. An additional 20 grams of 9 N KOH were used in each cell. Separators of modacrylic fiber were employed adjacent to the cathodes and fibrous cellulose adjacent to the zinc anodes.

A suitable container weighs 20 grams; thus, the total unit cell weight is 100 grams (representing 1/9 of a 9-cell, 12 volt battery). Unit cell capacity is a nominal 5 watt-hours, corresponding to approximately 25 Wh/lb at the 3-hour discharge rate (discharge to a cutoff of 0.9 volt in 3 hours).

FIG. 14 shows the 20-ampere discharge (the 6-minute rate) of such a cell, arranged in 12 pulses, 5-seconds each, for 3 minutes, thereby taking 1/6 of the total capacity out of the cell (at 20 amperes, a new cell operates for 6 minutes continuously until 0.9 volt is reached). After 20 charge-discharge cycles (in the 12th pulse of the 20th series), the cell reached 0.9 volt (see dashed curves in FIG. 14). This represents excellent performance considering that a commercial lead-acid cell of comparable size drops to 0.9 volt within one series of 20-A discharge pulses (20 ampere-minutes). It should be further noted that lead-acid batteries can tolerate high pulses in a daily sequence, but when put on shelf after such testing, their charge retention is extremely poor.

The variation in capacity of this cell at various discharge rates is shown below:

| 6-Hour Rate: | (0.7-A Discharge Current) |
|---|---|
| 4 Ah | 40 – 60 cycles |
| 3 Ah | 80 – 100 cycles |
| 1.5 Ah | 200 cycles |
| 3-Hour Rate: | (1.33-A Discharge Current) |
| 4 Ah | 60 – 80 cycles |
| 2 Ah | 150 cycles |
| 1 Ah | 300 cycles |
| 0.5 Ah | >800 cycles |
| 1-Hour Rate: | (4-A Discharge Current) |
| 4 Ah | 20 – 30 cycles |
| 6-Minute Rate: | (20-A Discharge Current) |
| 2 Ah | 12 – 15 cycles |

EXAMPLE 8

Manganese dioxide cathodes made according to this invention have demonstrated 90 per cent maintenance (charge retention) after 6 months storage at 45°C. in 9 N KOH.

Alkaline manganese dioxide-zinc batteries (FIG. 16) made with the electrodes of this invention have also demonstrated a sizeable capacity advantage in early cycle life on continuous discharge in comparison with a commercial lead-acid battery of the same nominal voltage (12V) and design. On a 0.6-ohm constant resistance drain, the eight-cell alkaline manganese dioxide batteries operated for 4–6 minutes to the 0.9 V (per unit cell) cutoff, compared to the 45 seconds to 1 minute time-to-cutoff advertised by the manufacturers of a 12-volt comparable sized lead-acid battery. The alkaline unit cells were constructed as shown in FIG. 15. There were eight compartments in the battery (FIG. 16), each measuring 3.3 × 2.2 × 0.413 inches. Each unit cell contained 6 thin manganese dioxide cathodes and five zinc anodes (of No. 5/0 expanded zinc grids). The cathodes (each 0.02 inch thick) were made of the following formulation:

| Components | Finished Electrodes |
|---|---|
| 35.8 g Electrolytic manganese dioxide | 82 |
| 3.6 g Powdered graphite | 8.2 |
| 0.72 g Fibers (Modacrylic or graphite) | 1.6 |
| 1.8 g Polystyrene | 4.1 |
| 1.8 g Colloidal graphite | 4.1 |

The solvent used for the polystyrene was tetrahydrofuran. The cathode collectors were silver-plated steel; anode collectors were tin-plated steel. The electrolyte was 9 N aqueous KOH containing 1 per cent by weight ZnO. "Permion" separators (made by Radiation Application, Inc., Long Island City, N.Y.) were used. Permion separators are commercial membranes composed of radiation grafted cellulose. The radiation grafted monomer is a material such as a methacrylate.

Figure 17:
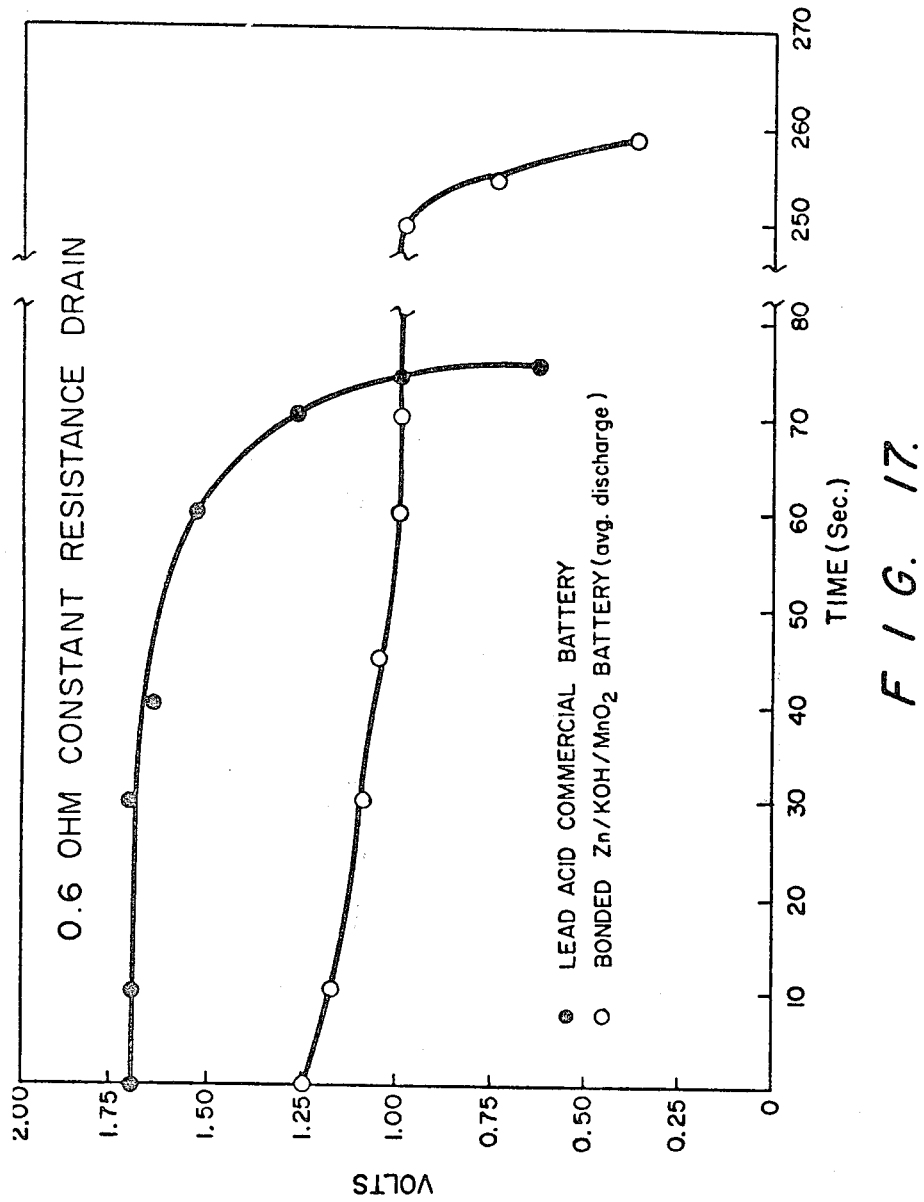
FIG. 17 is a graph showing the discharge time versus voltages of a unit cell of the type shown in FIG. 15 and a commercial lead/acid cell.

FIG. 17 illustrates the unit cell (FIG. 15) voltage on 0.6-ohm continuous drain on the eight-cell battery compared to that of a unit cell in the six-cell commercial lead-acid battery. The manganese dioxide-Zn unit cell of this invention had a somewhat lower voltage but ran for a much longer time than the lead-acid cell at this drain. As many as 20 cycles under these discharge conditions were obtained from alkaline manganese dioxide cells of this size compared to only a few cycles (e.g., 5) experienced with the lead-acid cell under the same conditions.

Figure 18:
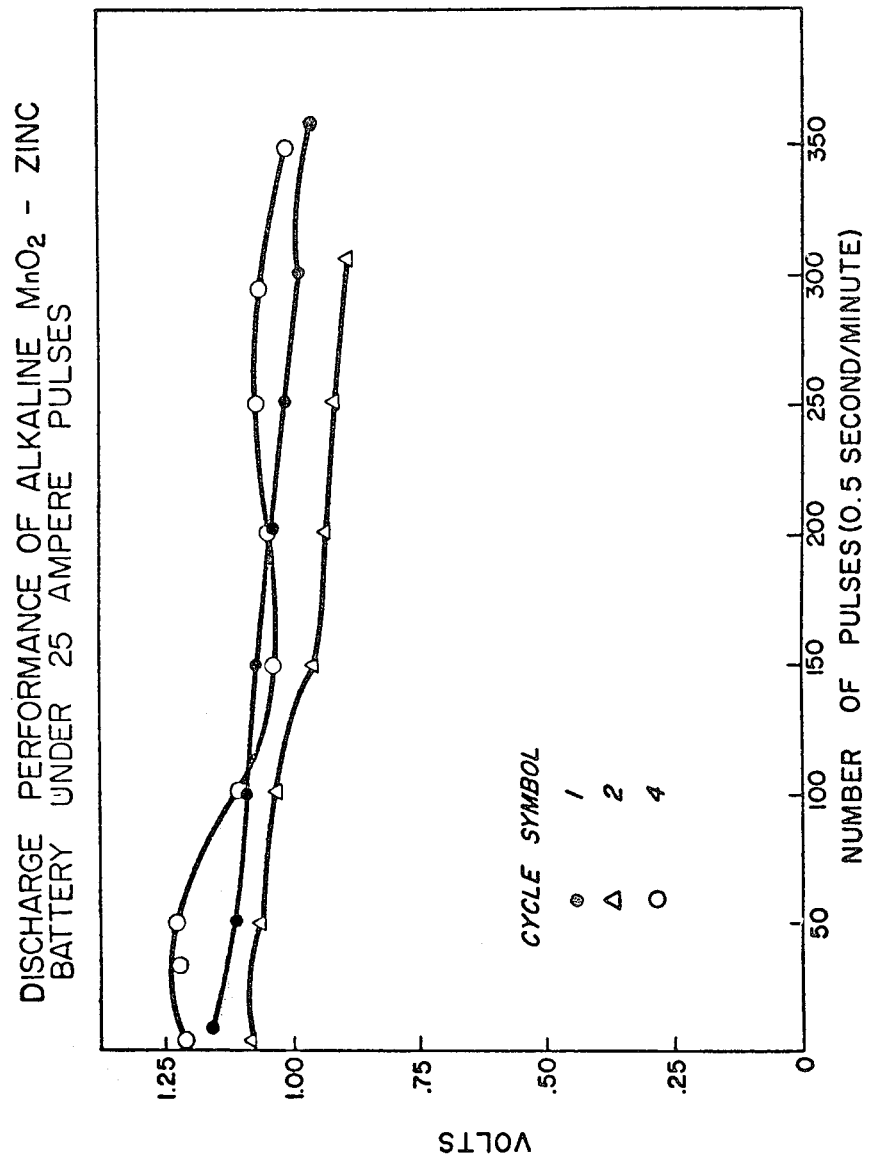
FIG. 18 is a graph showing the high current drain pulsing performance of a unit cell of the type shown in FIG. 15.

Unit alkaline manganese dioxide-Zn cells of the type described immediately above (FIG. 15) were also tested by pulsing under a 25 ampere pulse for 0.50 second once each minute. The discharge performance of several typical cells can be seen in FIG. 18, which shows that up to four recharges, 350 pulses were obtainable to a cutoff of 0.90 volt.

EXAMPLE 9

To illustrate the effect of liquid aqueous electrolyte on bonded electrodes, the following test was carried out. A number of disks containing 78 weight per cent manganese dioxide, 6 per cent Portland cement as binder, and 16 per cent powdered carbon was prepared. Other manganese dioxide disks containing 80 weight per cent manganese dioxide, 2 per cent polymethyl methacrylate binder, and 18 weight per cent particulate conductive material (both colloidal and non-colloidal) were made in accordance with a procedure analogous to Method 1. Samples of each type of disk were immersed in 9 N aqueous KOH at 50°C. for 1 week. At the end of this time, those disks bonded with Portland cement had already begun to crumble and exfoliate, whereas the polymer-bonded disks made according to this invention showed no evidence of disintegration.

EXAMPLE 10

To illustrate that not all carbons are suitable for use in this invention an electrode was prepared by Method 1 using the following components:

$MnO_2$ — 80 percent by weight

Graphite (particulate form) 10 percent by weight

Acetylene Black (very fine particulate form wetted with trichloroethylene) 5 percent Plastic binder (polysulfone dissolved in trichloroethylene) 5 percent During the preparing of the electrode, the acetylene black soaked up too much solvent thus making the extrusion mix very soft to handle and once molded, the electrode exhibited a high degree of porosity and relatively low conductivity. The short circuit current of a KOH system cell employing the electrode of this Example measured 5 amperes and the electrode had a KOH pick-up of about 8 ml KOH.

An identical electrode was prepared as above except colloidal graphite (5 percent) suspended in trichloroethylene was substituted for the acetylene black. The extrusion mix for this electrode was a relatively dense mix which upon being molded exhibited relatively good conductivity. The electrode was assembled in a KOH system cell, identical to the one used above, and the short circuit current of the cell measured 15 amperes while the electrode exhibited a KOH pick-up of about 2 ml KOH. This lower KOH pick-up substantially decreases the swelling of the electrode over the swelling of the electrode fabricated with acetylene black. The low pick-up of electrolyte is due to the low surface area of heat treated graphite as discussed above. Thus even though the particle size of the colloidal graphite was smaller than acetylene black and therefore, one would expect such smaller particles to absorb more electrolyte, the reverse occurred due to the surface area of the graphite being below about 100m$^2$/g as required in this invention. As stated above, the heat treatment of carbon causes a decrease in the chemical reactivity of the carbon which is attributed to the fact that the crystallite size and the reorientation of crystallites of the carbon will change thereby yielding a carbon surface composed increasingly of the basal plane of the crystallites.

What is claimed is:

1. A coherent electrode for use in electrochemical devices having an aqueous electrolyte, said electrode comprising particulate manganese dioxide and particulate electrically conductive material both of which are substantially dispersed in a binder, said binder comprising colloidal electrically conductive material having a surface area as defined by the B.E.T. method using $N_2$ absorption at 78°K. of less than about 100 m²/g, and an electrolyte-wettable polymer, thereby forming a polymeric binder.

2. The electrode of claim 1 wherein said polymer is selected from the group consisting of acrylonitrile-butadiene-styrene polymer, epoxy resin, polymerized lower alkyl ester of acrylic or methacrylic acid, melamine-formaldehyde resin, urea-formaldehyde resin, chlorinated polyether, polycarbonate, phenol-formaldehyde resin, polysulfone, polystyrene, styrene-acrylonitrile copolymer, polyvinyl chloride, vinyl chloride-vinyl acetate copolymer, polyvinyl alcohol, and styrene-butadiene copolymer.

3. The electrode of claim 1 wherein the polymer is an epoxy resin, a polymerized lower alkyl ester of acrylic or methacrylic acid, polysulfone, or polystyrene.

4. The electrode of claim 1 wherein the colloidal electrically conductive material is graphite, heat treated carbon, or a powdered metal, and wherein the particulate electrically conductive material is graphite, or heat treated carbon.

5. The electrode of claim 4 wherein the colloidal electrically conductive material is graphite.

6. The electrode of claim 1 wherein said electrode contains at least 1 weight per cent of said colloidal electrically conductive material, at least 5 weight per cent of said particulate electrically conductive material, at least 1 weight per cent of said polymeric binder, and at least 70 weight per cent of manganese dioxide, the percentages being based on weight of electrode.

7. The electrode of claim 1 wherein said electrode is a flat electrode having a thickness of from about 10 to about 50 mils.

8. An electrochemical device having an anode, a cathode, and an aqueous electrolyte in contact with said anode and cathode, wherein, in the charged condition, said cathode is the electrode of claim 1.

9. The electrochemical device of claim 8 wherein the anode is zinc, cadmium, lead, aluminum, or magnesium.

10. The electrochemical device of claim 8 wherein the anode is zinc or cadmium, and the electrolyte is aqueous alkali.

11. The electrochemical device of claim 8 wherein the anode is lead and the electrolyte is aqueous acid.

12. The electrochemical device of claim 8 wherein the anode is magnesium and the electrolyte is aqueous magnesium bromide.

13. Process for producing a coherent electrode comprising the steps:
   a. preparing a first mixture of an electrolyte-wettable polymeric binder and a colloidal electrically conductive material so as to form a conductive binder mixture;
   b. mixing particulate manganese dioxide, particulate electrically conductive material and the conductive binder mixture of step a) to form a mixture of said materials; and
   c. forming said mixture of the four materials into a coherent electrode wherein the particulate manganese dioxide and particulate electrically conductive material are dispersed in the conductive binder composed of the colloidal electrically conductive material and the electrolyte-wettable polymeric binder.

14. The process of claim 13 wherein in step (b) the forming of said mixture into a coherent electrode includes contacting said mixture with a current collector.

15. The process of claim 13 wherein the polymeric binder is selected from the group consisting of acrylonitrile-butadiene-styrene polymer, epoxy resin, polymerized lower alkyl ester of acrylic or methacrylic acid, melamine-formaldehyde resin, urea-formaldehyde resin, chlorinated polyether, polycarbonate, phenol-formaldehyde resin, polysulfone, polystyrene, styrene-acrylonitrile copolymer, polyvinyl chloride, vinyl chloride-vinyl acetate copolymer, polyvinyl alcohol, and styrene-butadiene copolymer.

16. The process of claim 13 wherein the colloidal electrically conductive material is graphite, heat treated carbon, or a powdered metal, wherein the particulate electrically conductive material is heat-treated carbon or graphite, and wherein the polymeric binder is employed as a solution or a dispersion in a volatile liquid.

17. The process of claim 16 wherein said colloidal electrically conductive material is graphite.

18. The process of claim 17 wherein the colloidal graphite is employed as a dispersion in said volatile liquid.

19. The process of claim 13 wherein step (b) includes subjecting said mixture of the four materials to pressure.

20. The process of claim 16 wherein step (b) includes subjecting said mixture of the materials to pressure, said volatilizing said volatile liquid to form pores in said coherent electrode.

* * * * *

PO-1050
(5/69)

UNITED STATES PATENT OFFICE
CERTIFICATE OF CORRECTION

Patent No. 3,945,847　　　　　　　Dated March 23, 1976

Inventor(s) K. V. Kordesch et al

It is certified that error appears in the above-identified patent and that said Letters Patent are hereby corrected as shown below:

Column 1, line 42, the word "hetetofore" should read -- heretofore --.

Column 10, line 53, the word "pass" should read -- passes --.

Column 10, line 63, after the word "manganese", the letters "th" should not appear there.

Column 13, line 63, the word "lower" should read -- low --.

Column 16, line 37, "2 X 2 1/4 X" should read --2 inches X 2 1/4 inches X --.

Signed and Sealed this

Nineteenth Day of October 1976

[SEAL]

Attest:

RUTH C. MASON
Attesting Officer

C. MARSHALL DANN
Commissioner of Patents and Trademarks